United States Patent [19]
Reinheimer et al.

[11] Patent Number: 4,501,476
[45] Date of Patent: Feb. 26, 1985

[54] DEVICE FOR CHECKING THE LIGHT SOURCE ADJUSTMENT IN AN INCIDENT LIGHT MICROSCOPE

[75] Inventors: Guenter Reinheimer, Biebertal; Winfried Kraft, Asslar-Werdorf, both of Fed. Rep. of Germany

[73] Assignee: Ernst Leitz Wetzlar GmbH, Wetzlar, Fed. Rep. of Germany

[21] Appl. No.: 393,798

[22] Filed: Jun. 30, 1982

[30] Foreign Application Priority Data

Jul. 4, 1981 [DE] Fed. Rep. of Germany ... 8119559[U]

[51] Int. Cl.³ ............................................. G02B 21/00
[52] U.S. Cl. .................................... 350/520; 350/522
[58] Field of Search ............... 350/520, 522, 523, 529, 350/566; 356/399, 138, 154, 153

[56] References Cited
U.S. PATENT DOCUMENTS 3,833,282  9/1974  Kappl et al. ...................... 350/520
4,168,429  9/1979  Lough ............................. 356/138 X Primary Examiner—John K. Corbin
Assistant Examiner—Lynn V. Kent
Attorney, Agent, or Firm—Schwartz, Jeffery, Schwaab, Mack, Blumenthal & Koch

[57] ABSTRACT

A device for checking the adjustment of the light source in an incident light microscope includes a centering cylinder having a configuration similar to an objective which is set into the revolving lens turret and can thus be moved into the path of the illuminating beam. The centering cylinder has a bottom plate with markings, for example, in the form of concentric rings and cross-hairs, located approximately in the rear focal plane of the lenses. The light source is thereby imaged on the markings. Observation is effected through an orifice in the jacket of the centering cylinder, which may be rotated around the optical axis. Focusing and adjustment may then be affected by adjusting the collecting lens and/or the lamp housing.

10 Claims, 4 Drawing Figures

DEVICE FOR CHECKING THE LIGHT SOURCE ADJUSTMENT IN AN INCIDENT LIGHT MICROSCOPE

BACKGROUND OF THE INVENTION

The present invention pertains to a device for checking the adjustment of a light source in an incident light microscope having a revolving lens turret. The device comprises a centering cylinder which has an observation orifice and is shaped essentially like a lens, so that it can be inserted into the revolving lens turret and thus can be brought into the path of the illuminating beam.

In incident light microscopy there are often difficulties encountered with regard to the accurate adjustment of the source of light, in that the object to be viewed is not illuminated to a uniform brightness. In order to determine whether the light source is adjusted correctly or whether its position must be corrected, a device of the afore-mentioned type is known which has a deflecting element in the optical axis, for example, a planar mirror inclined by 45° to the optical axis. By means of this mirror, the image of the light source is reproduced on a ground glass plate arranged parallel to the optical axis. The illuminating beam reflected by the mirror passes through a window provided in the housing of the device, so that the image of the light source (coiled filament or light spot) may be viewed and focused sharply by adjustment of the collecting lens in the lamp housing. Mounting a deflecting element inside the device and providing an observation window in its housing is expensive from a manufacturing standpoint. In the course of screwing this known centering device into the revolving lens turret, imaging inaccuracies may occur if the window therein is to face the observer.

SUMMARY OF THE INVENTION

It is therefore an object of the present invention to provide an improved device for checking the light source adjustment in an incident light microscope.

It is also an object of the invention to provide an inexpensive device for checking the adjustment of the light source in an incident light microscope which renders possible a convenient and rapid verification of the light source adjustment.

Another object of the invention resides in providing such a device which involves only a moderate manufacturing effort and includes an observation window facing the user of the microscope.

In accomplishing the foregoing objects, there has been provided in accordance with the present invention a device for checking the adjustment of a light source in an incident light microscope having a revolving lens turret, comprising a centering cylinder having the approximate shape of a lens and being insertable into the revolving lens turret, whereby the centering cylinder can be moved into the path of the illuminating beam of the light source. The centering cylinder has a bottom plate located on the side facing an object to be observed with the microscope and occupies a position in the beam path corresponding approximately to the rear focal plane of a selected lens in the lens turret. There is at least one set of markings on the bottom plate, and means are included for rotatably mounting the centering cylinder in the revolving lens turret so that the centering cylinder is rotatable about its optical axis. Also, the centering cylinder has an orifice therein for observing the markings on the bottom plate.

Further objects, features and advantages of the invention will become apparent from the detailed description of preferred embodiments which follows, when considered with the attached figures of drawing.

DETAILED DESCRIPTION OF PREFERRED EMBODIMENTS

Figure 1:
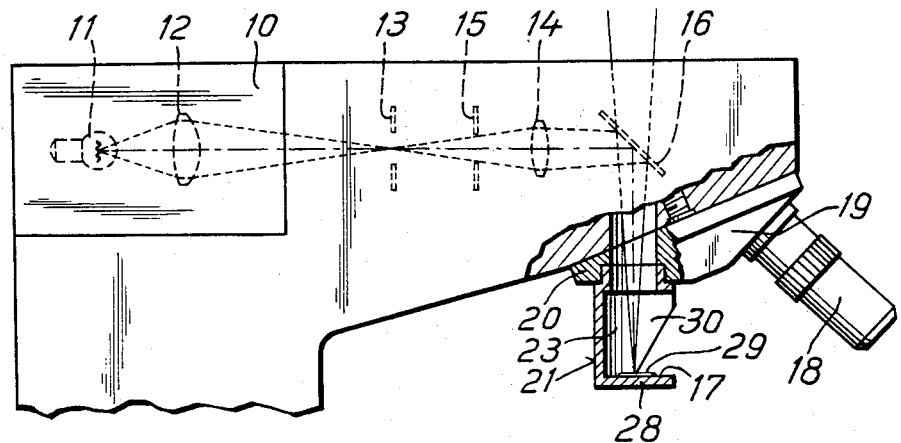
FIG. 1 is a side view, partly in section, of a microscope housing schematically illustrating the path of the beam of an incident light illuminating device, with the centering cylinder according to the invention inserted therein.

According to the invention, the centering cylinder is equipped with a bottom plate on the side toward the object. The bottom plate is located in the beam of light approximately in correspondence to the rear focal plane of the lenses of the microscope and carries certain markings. When inserted in the revolving lens turret, the centering cylinder may be rotated around the optical axis. The centering cylinder according to the invention can be made in a simple manner, for example, by injection molding a synthetic plastic material, and it has no optical structural elements, such as deflecting elements or curved windows, which are difficult to subsequently install. The marking on the bottom plate of the centering cylinder, for example, a crosshair arrangement in combination with a number of rings concentric with its center, may be adhesively bonded to the bottom plate in the form of a paper disk. Because the centering cylinder inserted in the revolving lens turret is axially rotatable, it is possible to immediately rotate the observation orifice so that it points in the direction of the user, independently of the position in which the centering cylinder is inserted.

For this purpose, the centering cylinder can be rotatably supported on a carrier which is designed to be inserted into the revolving lens turret. The carrier is surrounded by a jacket which is arrestable by a clamp screw. The centering cylinder equipped with threads is screwed into an empty socket of the revolving lens turret with the clamping screw in the loosened state, and the jacket is rotated until the observation orifice faces the user. The clamping screw may then be tightened to secure the jacket in this position.

According to a further advantageous embodiment of the invention, the centering cylinder can be rotatably fastened to the revolving lens turret by means of clamping straps which are equipped with a threaded section. For this purpose, the clamping straps of the centering cylinder need only be compressed and the cylinder inserted into an empty socket of the lens turret, with the threaded sections serving to secure it in position.

Since the markings on the bottom plate of the centering cylinder are located approximately in the rear focal plane of the microscope lenses, the light source is reproduced on the markings when the revolving lens turret is rotated and the centering cylinder is inserted into the path of the illuminating beam. By adjusting the collecting lens in the lamp housing, the image visible through the observation orifice of the centering cylinder can then be focused sharply and/or by adjusting the lamp housing, the image can be adjusted onto the center of the cross-hairs.

The markings may consist of cross-hairs, concentric rings, angles or the like; they may be drawn on a disk of paper, cardboard or the like and fastened with it to the bottom plate. It may be advantageous to make the bottom plate of the centering cylinder of a transparent material, so that the novel device can also be used with the so-called inverted microscopes.

In the drawing, two exemplary embodiments of the device according to the invention are shown schematically.

The incident light illuminating device shown in FIG. 1 contains in a centerable lamp housing 10 a light source 11, which is reproduced in the plane of a variable aperture diaphragm 13 by means of a collecting lens 12 (Koehler's principle of illumination). To avoid scattered light, a luminous field diaphragm 15 is provided in front of the condenser lens 14. After being refracted in the condenser lens 14, the illuminating beam is deflected by a partially transparent mirror 16 and images the light source 11 in a plane 17. This corresponds approximately to the rear focal plane of the lenses 18 carried by the revolving lens turret 19. In one socket 20 of the revolving lens turret 19, a lens-shaped centering cylinder 21 is mounted, which, in the position shown, is located in the path of the illuminating beam.

Figure 2:
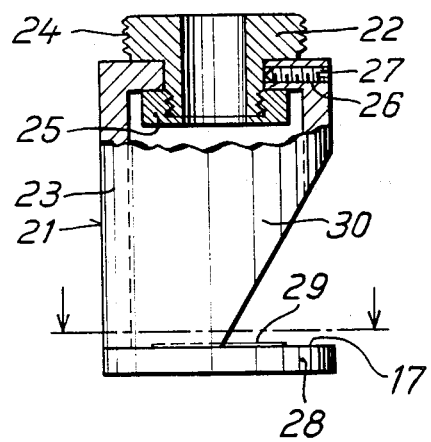
FIG. 2 is a side view, partly in section, of a first embodiment of the centering cylinder according to the invention.
Figure 4:
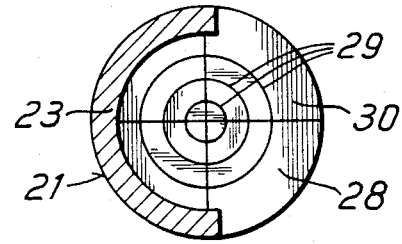
FIG. 4 is a top view of the bottom plate of the centering cylinder, with markings applied to it.

The centering cylinder 21, shown enlarged in FIG. 2, consists of a cylindrical carrier 22 which is surrounded by a jacket 23 and is provided on its upper, widened end with threads 24 and on its lower end with a holding ring 25, upon which the jacket 23 rests. The upper section of the jacket 23 entering between the threads 24 and the holding ring 25 is equipped with a threaded bore 26 having therein a clamping screw 27. With this screw, the jacket 23 may be clamped to the carrier 22. The centering cylinder 21 is bounded at the bottom by an opaque bottom plate 28, which carries markings 29, for example, in the form of cross-hairs and concentric rings (FIG. 4). The latter are visible from the outside through an observation orifice 30 in the jacket 23.

Figure 3:
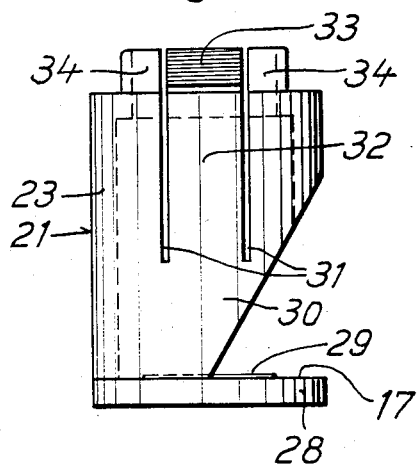
FIG. 3 is a side view of a second embodiment of the centering cylinder according to the invention.

The exemplary embodiment shown in FIG. 3 is constructed in one piece and differs from the one in FIG. 2 furthermore in that the centering cylinder 21 has axial slits 31, whereby two resilient clamping straps 32 are formed, each of which is provided at its upper end with a threaded section 33, serving to secure the position of the inserted centering cylinder 21. In contrast, the two cylinder segments 34 do not contain any threaded section on the upper end region, and they can be slid into the socket 20 in closely fitting contact.

The device described hereinabove is suitable for the verification of the light source adjustment in incident light microscopes utilizing bright field illumination. Naturally, it is similarly suitable for incident light, dark field microscopy. For this purpose it is merely necessary to provide, in a manner known per se (DE-OS No. 25 42 075), optical means in the path of the illuminating beam which make it possible to reproduce the dark field illuminating beam path.

What is claimed is:

1. A device for checking the adjustment of a light source in an incident light microscope having a revolving lens turret comprising:
    a centering cylinder having the approximate shape of a lens cylinder;
    a bottom plate located on the end of said cylinder facing an object to be observed with the microscope, said bottom plate occupying a position in the beam path corresponding approximately to the rear focal plane of a selected lens in the lens turret, and having at least one set of markings;
    orifice means, provided on said centering cylinder, for permitting observation of said markings; and
    means attached to said centering cylinder for mounting said centering cylinder in said revolving lens turret rotatably about an optical axis of said centering cylinder.

2. a device according to claim 1, wherein said mounting means for the centering cylinder comprises a carrier which is rotatable with respect to said centering cylinder and is adapted to be inserted into the revolving lens turret.

3. A device according to claim 2, further comprising means for arresting the rotation of the centering cylinder about its optical axis in a selected position.

4. A device according to claim 3, wherein said arresting means comprises a set screw in said centering cylinder adapted to engage with said carrier.

5. A device according to claim 1, wherein said mounting means for the centering cylinder comprises a plurality of resilient, outwardly biased clamping straps at its end facing the revolving lens turret, each of said straps being equipped with a threaded section for fastening the cylinder to the revolving lens turret.

6. A device according to claim 1, wherein said bottom plate carrying said markings is comprised of a transparent material.

7. A device according to claim 1, wherein said orifice opens in said centering cylinder so that the markings on the bottom plate are directly visible.

8. A device according to claim 1, wherein said markings comprise a cross-hair with at least one ring concentric with the center of the cross-hair.

9. A device as claimed in claim 1, wherein said orifice means are positioned at the other end of said centering cylinder.

10. An incident light microscope, comprising:
    a light source;
    a revolving lens turret;
    a centering cylinder having the approximate shape of a lens cylinder;
    a bottom plate located on the end of said cylinder facing an object to be observed with the microscope, said bottom plate occupying a position in the beam path corresponding approximately to the rear focal plane of a selected lens in the lens turret, and having at least one set of markings;
    orifice means, provided on said centering cylinder, for permitting observation of said markings; and
    means attached to said centering cylinder for mounting said centering cylinder in said revolving lens turret rotatably about an optical axis of said centering cylinder.

* * * * *